(12) United States Patent
Soliman et al.

(10) Patent No.: US 8,137,236 B2
(45) Date of Patent: *Mar. 20, 2012

(54) OUPUT TORQUE MODULATION CONTROL OF A TRANSMISSION IN A HYBRID ELECTRIC VEHICLE

(75) Inventors: Ihab S. Soliman, Warren, MI (US); Andrew J. Silveri, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 936 days.

This patent is subject to a terminal disclaimer.

(21) Appl. No.: 12/163,132

(22) Filed: Jun. 27, 2008

(65) Prior Publication Data

US 2009/0325760 A1 Dec. 31, 2009

(51) Int. Cl.
H20P 17/00 (2006.01)
(52) U.S. Cl. ................ 477/15; 477/20; 477/98
(58) Field of Classification Search .............. 477/2, 3, 477/15, 20, 98
See application file for complete search history.

(56) References Cited

U.S. PATENT DOCUMENTS

| 5,943,918 | A * | 8/1999 | Reed et al. ............... 74/661 |
| 6,945,893 | B2 * | 9/2005 | Grillo et al. ............. 475/5 |
| 7,396,316 | B2 * | 7/2008 | Tabata et al. ............ 477/107 |
| 7,513,847 | B2 * | 4/2009 | Tabata et al. ............ 477/15 |
| 7,755,309 | B2 * | 7/2010 | Gebert et al. ........... 318/139 |
| 7,935,022 | B2 * | 5/2011 | Iwase et al. ............. 477/5 |

* cited by examiner

*Primary Examiner* — Ha D. Ho
(74) *Attorney, Agent, or Firm* — David B. Kelley, Esq.; MacMillan, Sobanski & Todd, LLC (57) ABSTRACT

In a powertrain for motor vehicle that includes an engine, an electric machine, a transmission having an input driveably connected to the engine and a transmission output driveably connected to the electric machine, and a powertrain output driveably connected to the electric machine and wheels of the vehicle, a method for controlling torque during a shift includes transmitting engine torque through the transmission to the powertrain output; during a shift, operating the electric machine to modify the torque transmitted to the powertrain output; and storing energy generated by the electric machine during the shift.

19 Claims, 10 Drawing Sheets

OUPUT TORQUE MODULATION CONTROL OF A TRANSMISSION IN A HYBRID ELECTRIC VEHICLE

BACKGROUND OF THE INVENTION

1. Field of the Invention

This invention relates generally to a powertrain for a hybrid electric vehicle (HEV), and in particular to controlling torque transmitted by the output of the powertrain to the vehicle wheels while executing a gear shift.

2. Description of the Prior Art

Figure 1:
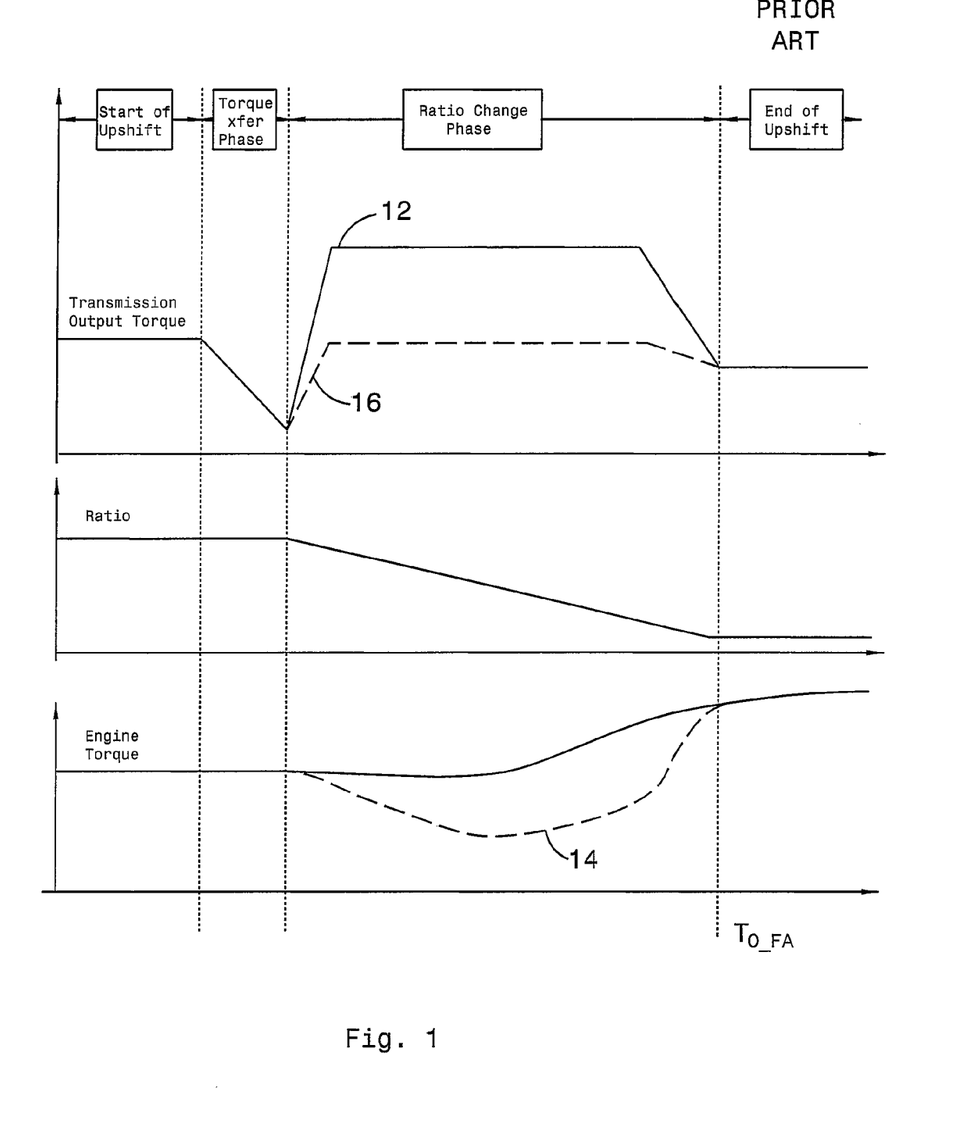
FIG. 1 is a graph that illustrates the variation of transmission output shaft torque, gear ratio and engine torque during an upshift with input torque modulation in a conventional vehicle driveline.

In a conventional vehicle with a fixed-ratio transmission, the driver can experience driveline disturbances during a transmission shift event, i.e., an upshift or a downshift. The driveline disturbances occur due to the acceleration and deceleration of engine and transmission components, which acceleration and deceleration produce an inertial torque during the shift event. In the case of an upshift, the transmission output torque increases during the ratio change phase, i.e., inertia phase, of the shift as a result of the engine speed changing, as shown in FIG. 1 at point 12. This output torque disturbance is felt by the vehicle's occupants and severely degrades shift quality.

The magnitude of the output shaft torque disturbance increases the faster the upshift is performed, since the magnitude of engine deceleration is greater. By reducing engine torque produced during the upshift, as shown at point 14, the inertial torque can be offset and the output shaft torque increase can be minimized, as shown at point 16, thereby improving the quality of the shift. This method described with reference to FIG. 1 is referred to as "input torque modulation" control.

Figure 2:
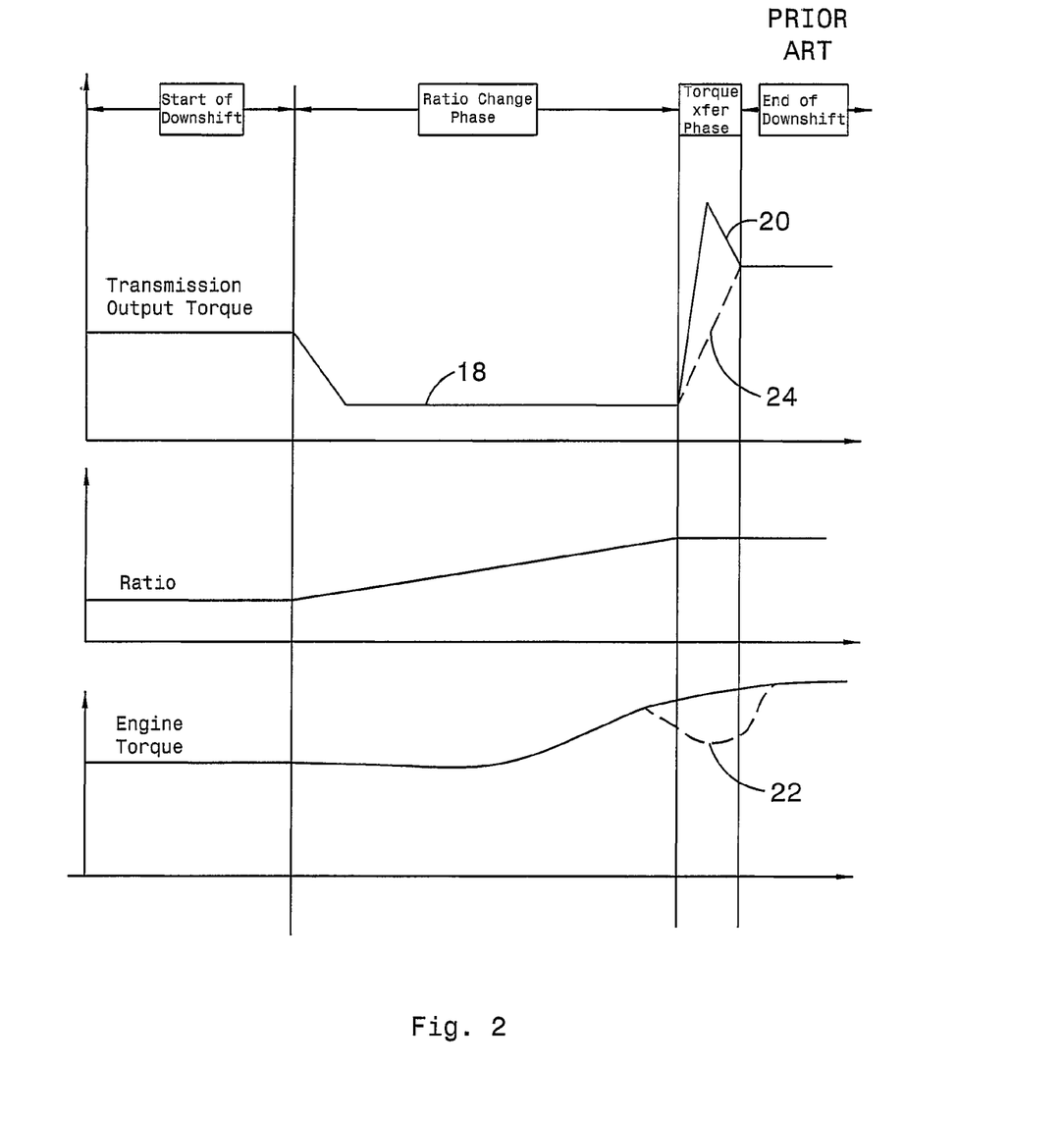
FIG. 2 is a graph that illustrates the variation of transmission output shaft torque, gear ratio and engine torque during an downshift with input torque modulation in a conventional vehicle driveline.

In the case of a downshift, the transmission output torque decreases during the ratio change phase as the engine and transmission components accelerate to the synchronous speed for the lower gear, as shown in FIG. 2 at point 18. Moreover, as shown at point 20 during the torque transfer phase, the transmission output torque can spike near the completion of the downshift as the engine accelerates. The drop in output torque during the ratio change phase is felt by vehicle's occupants and can give the sense of an acceleration discontinuity as the downshift is performed. The output torque spike at the end of the downshift can degrade shift quality and give the occupants a feeling of a harsh or rough shift. Furthermore, the magnitude of output shaft torque drop and spike near the end of the downshift increases in proportion to speed of the downshift. By using input torque modulation, the engine combustion torque is reduced near the end of the downshift, as shown at point 22, in order to reduce the engine's acceleration as the shift ends. As a result, the transmission output torque spike can be minimized and avoided, as shown at point 24, thereby reducing the shift disturbance.

In conventional vehicle applications, the problems that can occur with input torque modulation during shifts include limited engine torque reduction authority due to other constraints such as emissions, delayed or poor engine torque response to torque modulation requests, further degrading shift quality; and wasted fuel energy and efficiency since spark retardation is commonly used for achieving torque modulation requests.

SUMMARY OF THE INVENTION

In a powertrain for motor vehicle that includes an engine, an electric machine, a transmission having an input driveably connected to the engine and a transmission output driveably connected to the electric machine, and a powertrain output driveably connected to the electric machine and wheels of the vehicle, a method for controlling torque during a shift includes transmitting engine torque through the transmission to the powertrain output; during a shift, operating the electric machine to modify the torque transmitted to the powertrain output; and storing energy generated by the electric machine during the shift.

Excess transmission output torque is converted into electrical energy that is stored by a battery while achieving the requested torque modulation and providing optimum shift quality.

Delays in crankshaft torque reduction are avoided by taking advantage of the electric machine's responsiveness, which produces an accurate magnitude of torque modulation.

In some cases, the electric machine and engine both reduce the total driveline output torque shift disturbance to meet the requested torque modulation level. This is useful in the case where the electric machine may not be fully available or the battery state of charge is near the maximum limit.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 3:
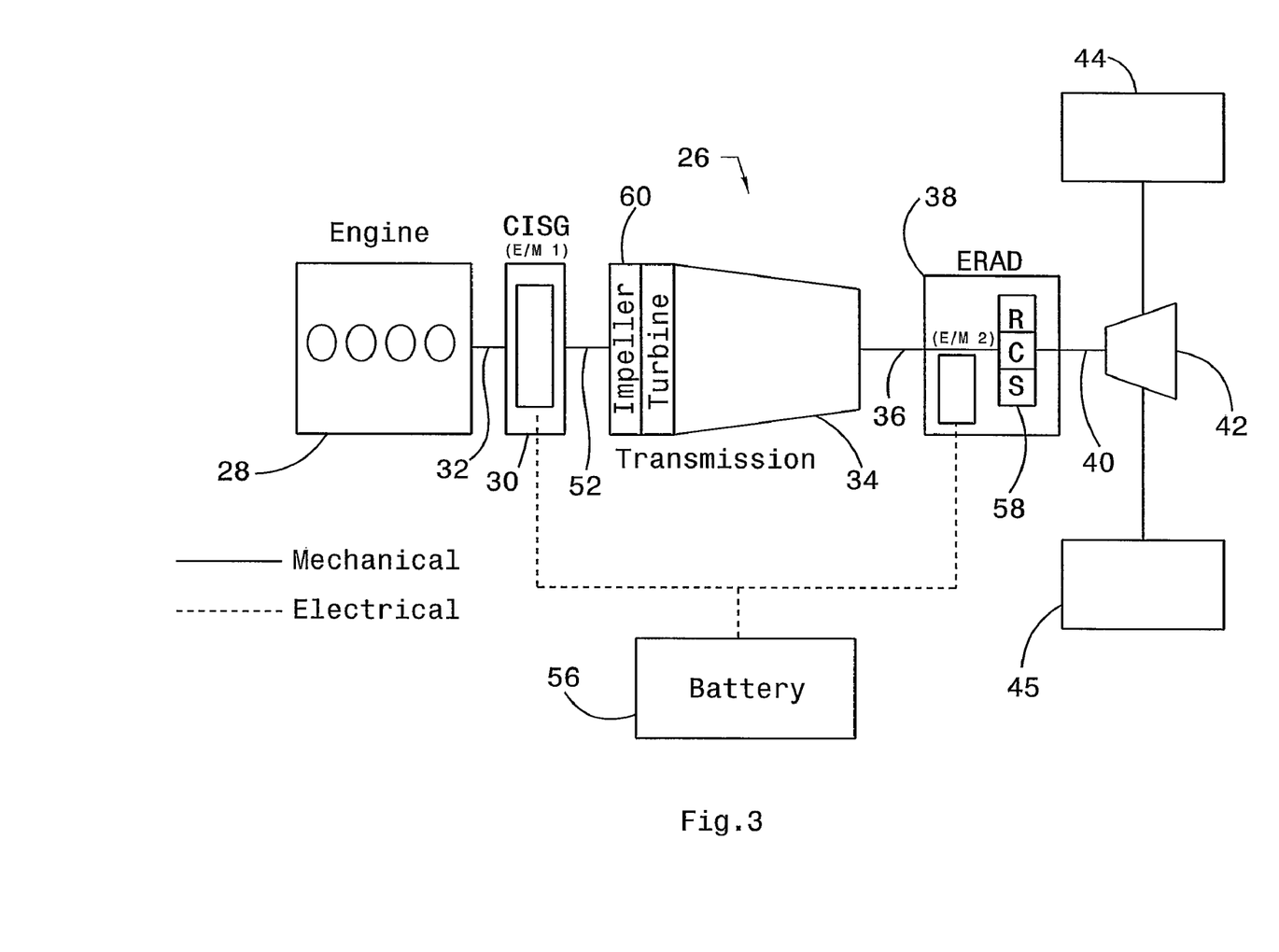
FIG. 3 is a schematic diagram of a powertrain for a RWD HEV.

FIG. 3 illustrates a powertrain 26 for a hybrid electric vehicle that includes an internal combustion engine (ICE) 28, preferably an Atkinson cycle ICE; a first electric machine 30, preferably a crank integrated starter generator (CISG) driveably connected to the engine crankshaft 32 and able to function alternately as a motor and a generator; a fixed-ratio automatic transmission 34, a second electric machine 38 such as an electric rear axle drive (ERAD) or electric front axle drive (EFAD) driveably connected to transmission output shaft 36 and able to function alternately as a motor and a generator; a driveline output shaft 40, driveably connected to the second electric machine 38; a differential mechanism 42; and wheels 44, 45, driveably connected to the differential 42.

During a transmission shift event, the electric machine 38 that is coupled to the transmission output can be controlled to achieve accurately the transmission torque modulation request and reduce the driveline output torque shift disturbance at 40. By using the electric machines 30, 38 and the powertrain 26, torque disturbances on transmission output shaft 36 can be reduced and optimum shift quality can be achieved. Other configurations including RWD, FWD, or AWD full or mild HEV with at least one electric machine at the transmission output are also applicable. Furthermore, this concept is not limited to any particular transmission technology and includes conventional automatic, dual clutch (i.e. powershift), and converterless automatic transmissions.

Figure 4:
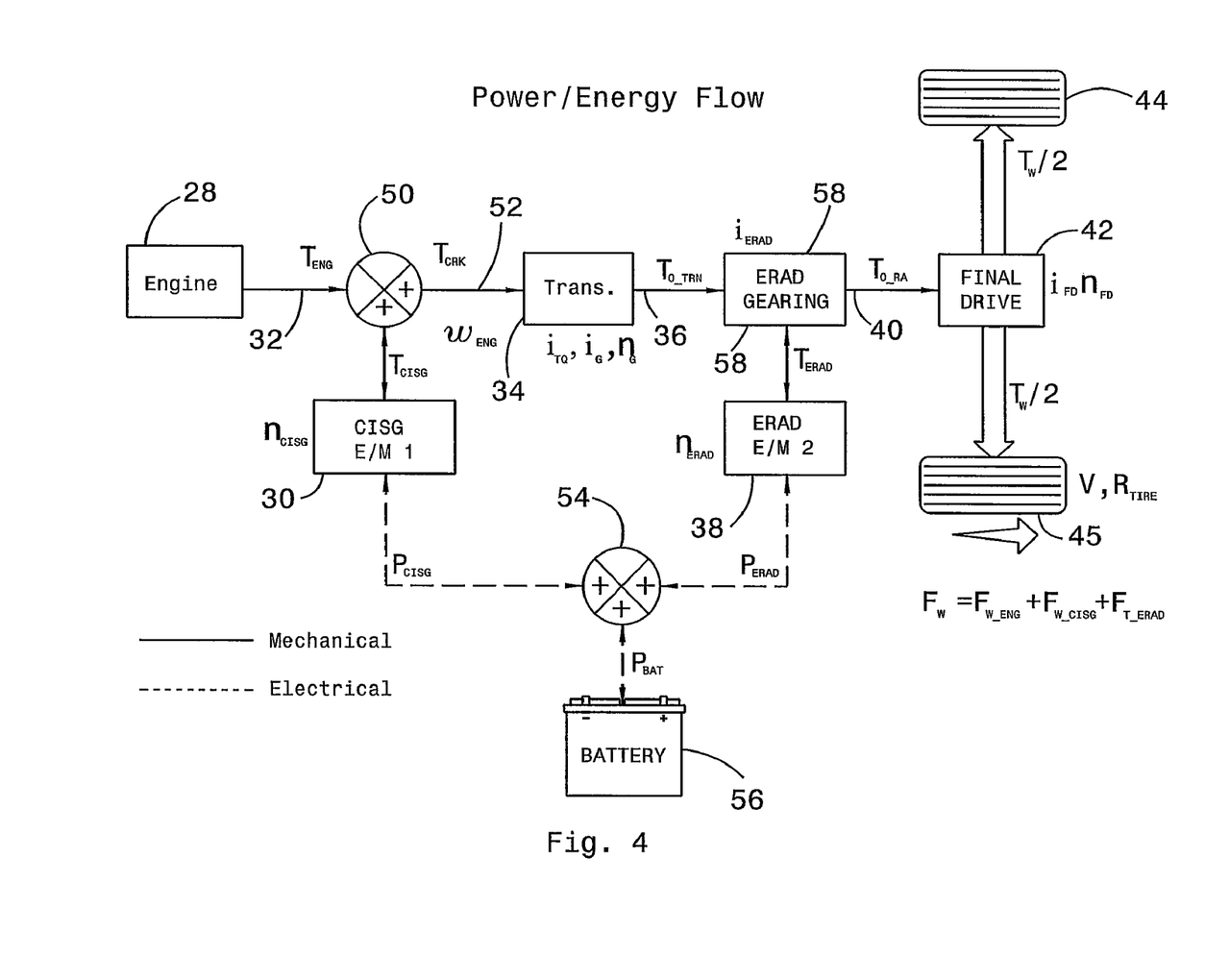
FIG. 4 is a schematic diagram showing propulsion and power flow in the HEV powertrain of FIG. 3.

FIG. 4 illustrates the power and energy flow in the powertrain 26. Power produced by engine 28 and power produced by CISG 30 are combined at 50 and transmitted to the transmission input 52. Electric power produced by both electric machines 30, 38 is combinable at 54 for charging the battery 56, or is transmitted from the battery to the electric machines 30, 38. Mechanical power produced by ERAD 38 is transmitted through ERAD gearing 58 to the load at the wheels 44, 45 through the rear final drive 42.

The RWD-HEV CISG/ERAD platform shown in FIG. 3 preferably incorporates an Atkinson cycle (4.6 L, 3V) internal combustion engine, a fixed ratio, six-speed automatic transmission and two electric machines. The first electric machine 30 (CISG) is integrated at the output 32 of the engine 28 and is connected to the impeller 60 of a torque converter transmission, thus providing starter/generator capability. The second electric machine 38 (ERAD) is coupled to the output 36 of the transmission 34 through a planetary gear set 58, which is connected to the final drive, thus providing additional propulsion capability in either an electric drive or hybrid drive mode.

Major operating modes for this powertrain configuration include (1) electric drive with ERAD motoring/generating); series hybrid drive with engine running, CISG generating and ERAD motoring/generating); engine drive with CISG & ERAD shutdown and conventional drive; parallel hybrid drive with engine running and CISG and ERAD motoring; engine starting with CISG motoring to start engine and the engine cranking; and engine stopped with the engine cranking or shutting down.

Figure 5:
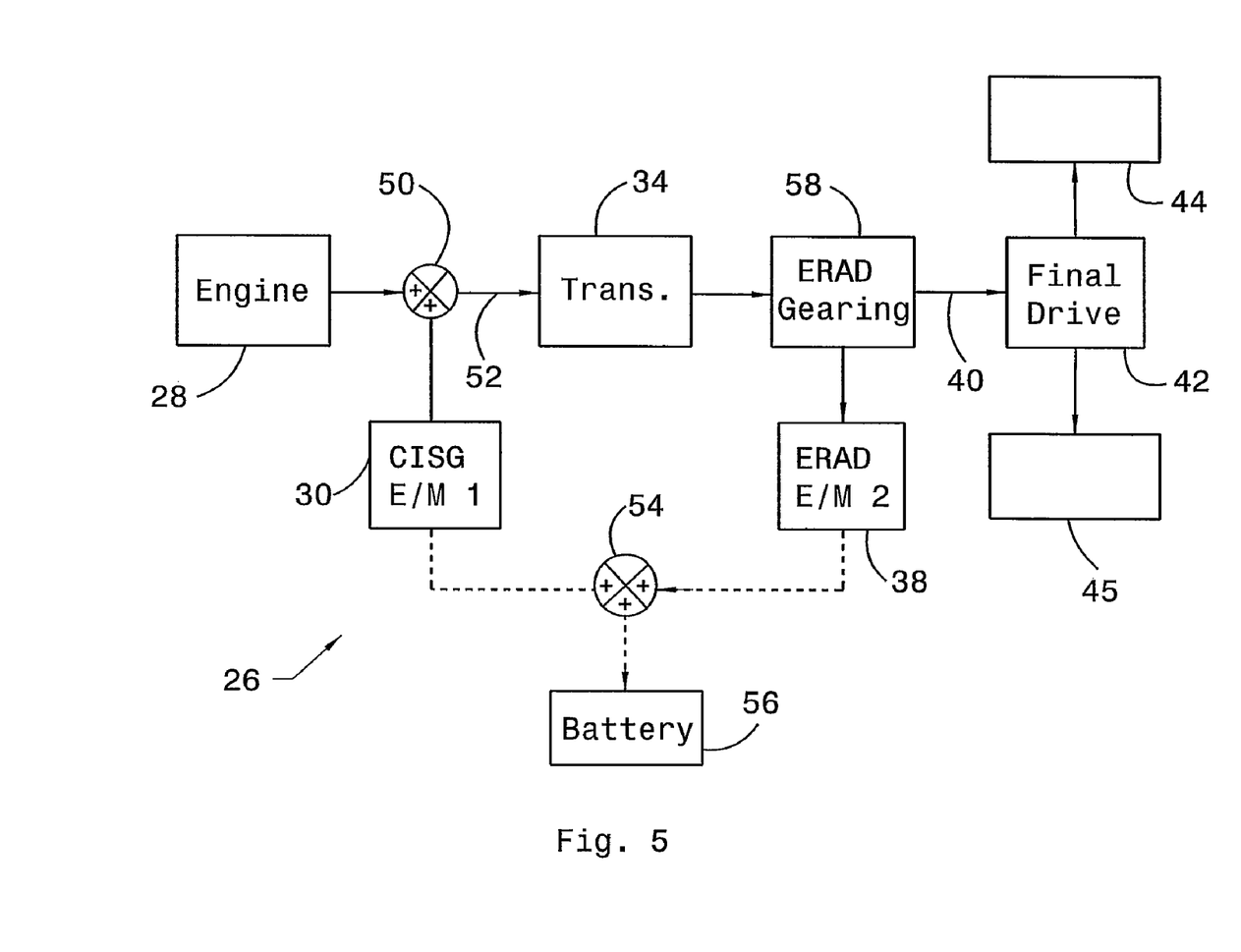
FIG. 5 is a schematic diagram showing vectors representing torque transmission among components of the powertrain operating in mode A.
Figure 6:
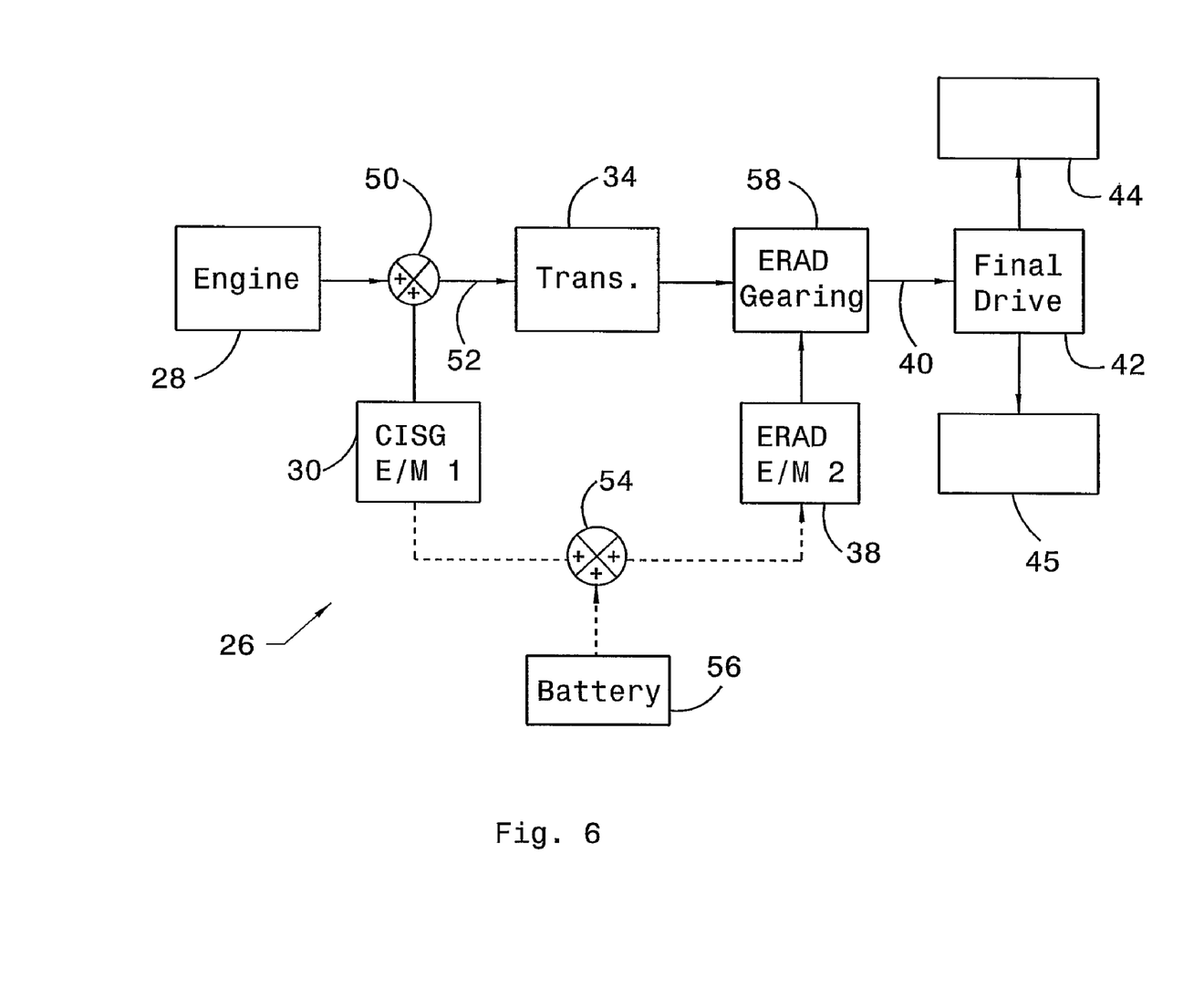
FIG. 6 is a schematic diagram showing vectors representing torque transmission among components of the powertrain operating in mode B.
Figure 7:
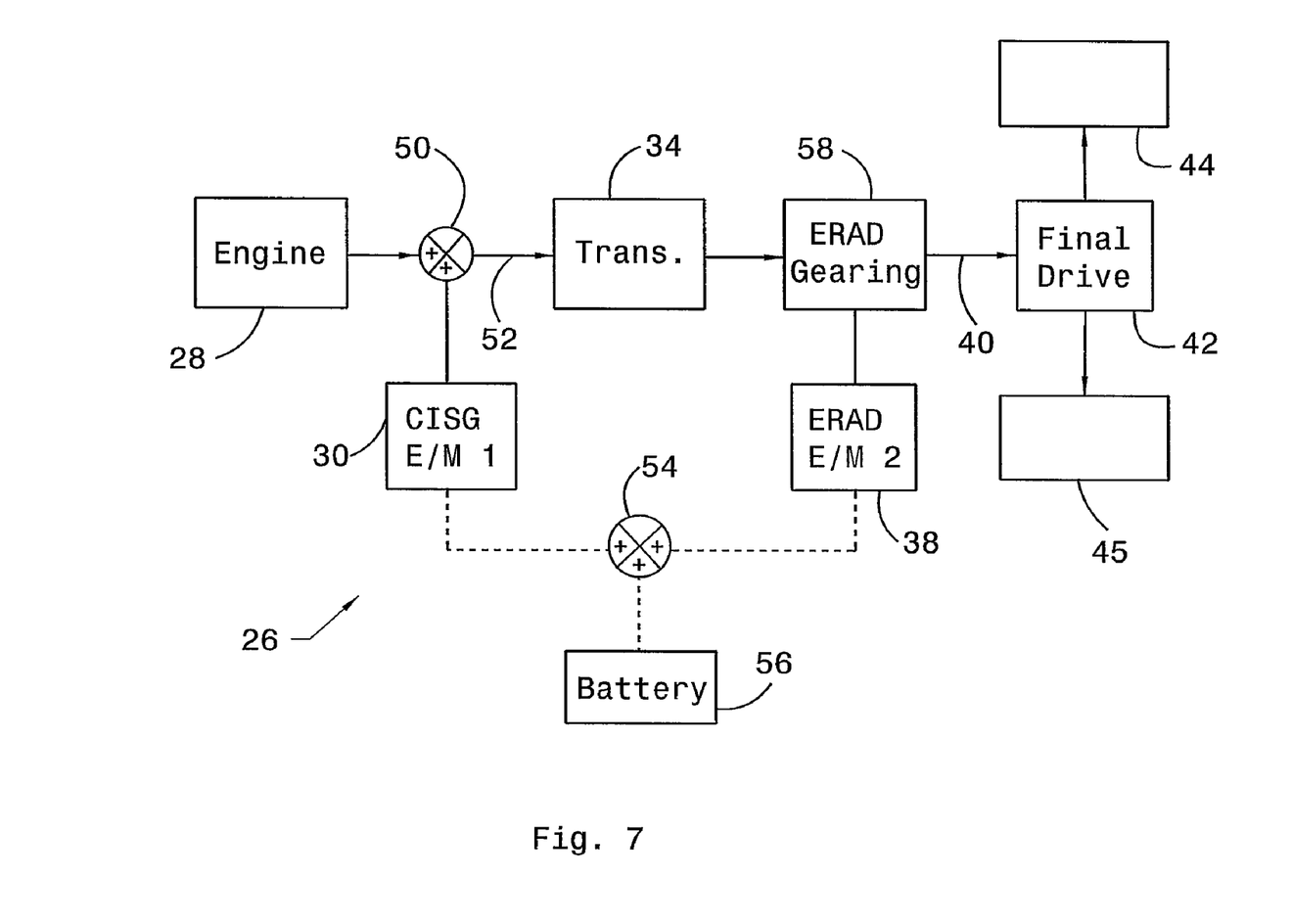
FIG. 7 is a schematic diagram showing vectors representing torque transmission among components of the powertrain operating in mode D.
Figure 8A:
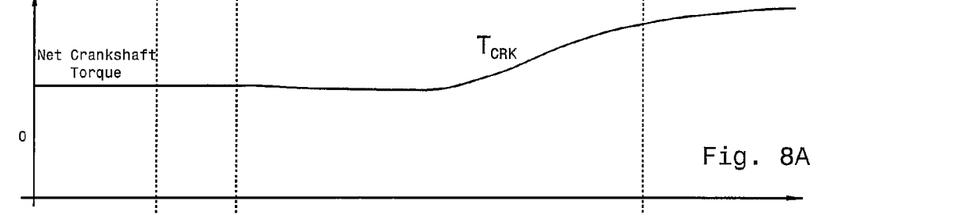
FIGS. 8A-8D illustrate the change of powertrain variables during a transmission upshift performed with output torque modulation.
Figure 8B:
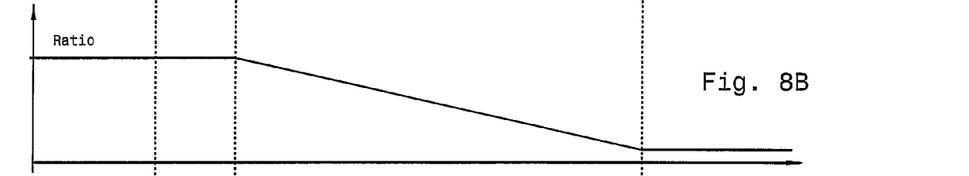
Figure 8C:
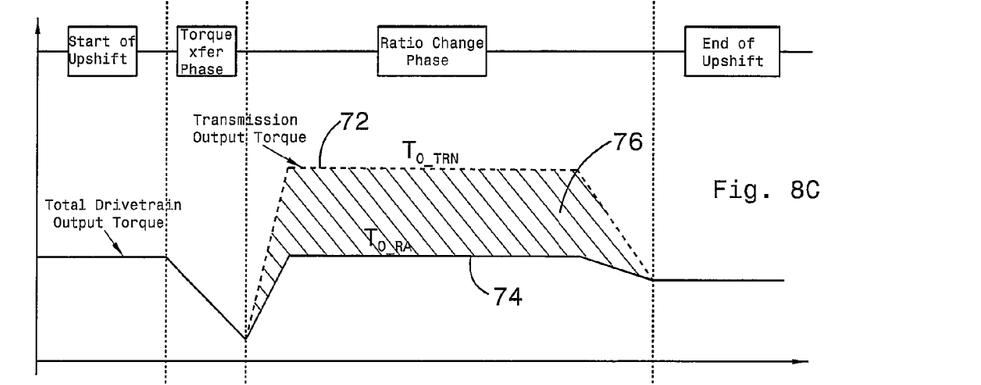
Figure 8D:
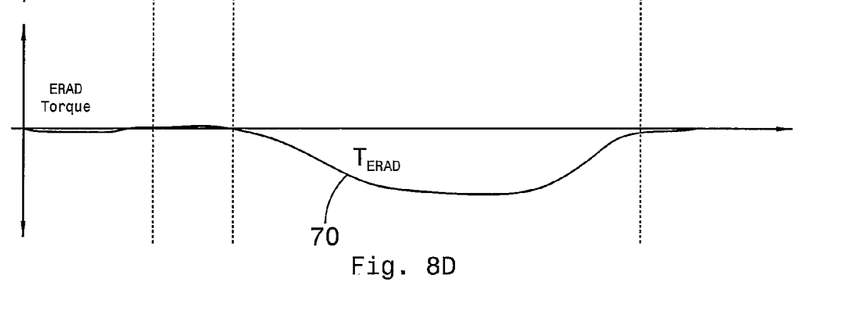

As shown in FIGS. 5-7, operating modes of the powertrain 10 are used to provide transmission output torque modulation during transmission shift events. Depending on the type of shift event, i.e., an upshift or downshift, level of torque modulation request, ERAD operating conditions, battery conditions, and other factors, the appropriate powertrain operating mode will be used to provide the desired output torque modulation request.

FIG. 5 is a schematic diagram of the powertrain 26 showing vectors representing torque transmission among components during operating mode A, in which output torque modulation occurs with ERAD 38 reducing driveline output torque during a gear shift.

FIG. 6 is a schematic diagram of the powertrain 26 showing vectors representing torque transmission among components during operating mode B, in which output torque modulation occurs with ERAD 38 increasing driveline output torque during a gear shift.

FIG. 7 is a schematic diagram of the powertrain 26 showing vectors representing torque transmission among components during operating mode D, in which torque modulation occurs with only the engine 28 reducing driveline output torque during a gear shift.

FIGS. 8A-8D illustrate an example of a transmission upshift, in which output torque modulation is provided by the ERAD 38 using the power path of operating mode A, shown in FIG. 5. In operating mode A, ERAD 38 provides output torque modulation by operating as a generator and provide negative torque as shown at 70, reducing the transmission output torque disturbance 72 during the shift to provide a smooth total driveline output torque 74, provided the ERAD is available for this purpose. The ERAD 38 is available if its current temperature is lower than its thermal limit, its speed is lower than its operational speed limit, and the state of charge (SOC) of battery 56 is below the maximum allowable SOC limit.

By using operating mode A, excess transmission output torque 76 is converted into electrical energy that is stored by battery 56 while achieving the requested torque modulation and providing optimum shift quality. Furthermore, delays in crankshaft torque reduction are avoided by taking advantage of the ERAD's responsiveness, which produces an accurate magnitude of torque modulation. In operating mode A, both the ERAD 38 and engine 28 can also be used to reduce the total driveline output torque shift disturbance 72 in order to meet the requested torque modulation level. This combination of engine 28 and ERAD 38 is useful in the case where the ERAD may not be fully available or the battery SOC is near its maximum limit.

Figure 9A:
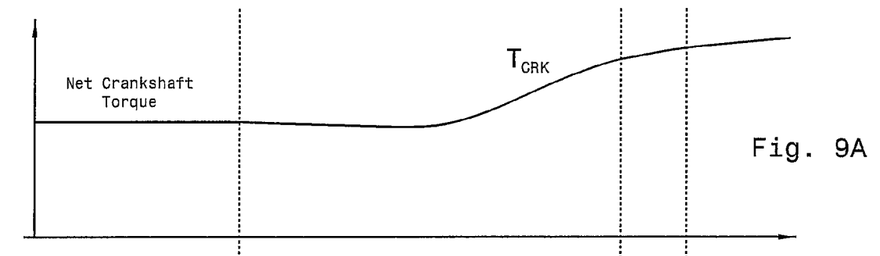
FIGS. 9A-9D illustrate the change of powertrain variables during a transmission downshift performed with output torque modulation.
Figure 9B:
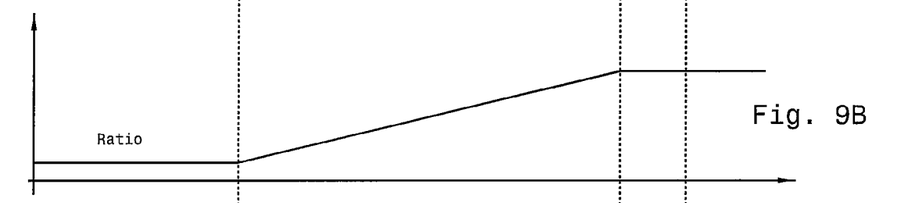
Figure 9C:
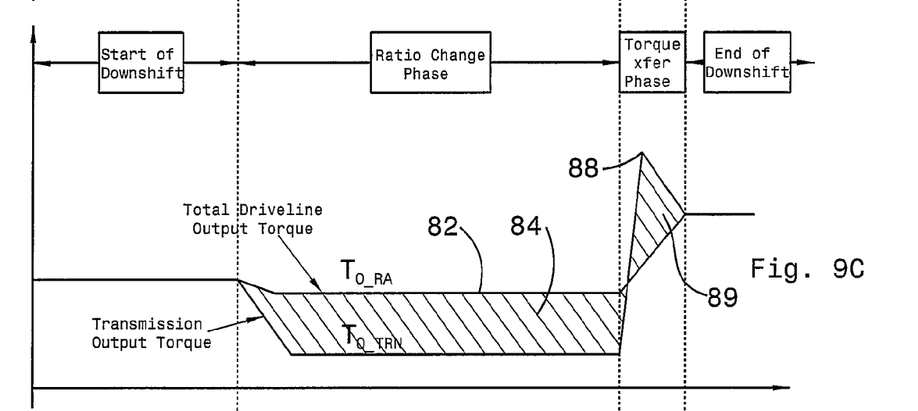
Figure 9D:
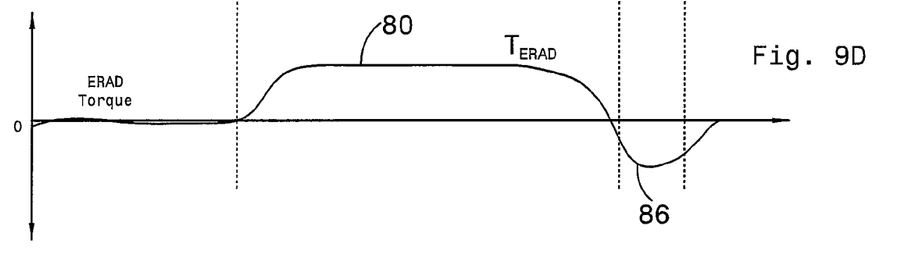

FIGS. 9D-9D illustrate an example of a transmission downshift in which output torque modulation is provided by the ERAD 38 using both operating modes A and B. During the ratio change phase of the downshift, operating mode B can be used with the ERAD 38 in a motoring mode to produce ERAD output torque 80 so that the net total driveline output torque 82 is increased in order to offset or compensate for the decrease 84 in transmission output torque that normally occurs during the ratio change phase of a downshift. Operating mode B can only be used if ERAD 38 is available for this purpose. The ERAD 38 is available if its current temperature is lower than its thermal limit, its speed is lower than its operational speed limit, and the state of charge (SOC) of battery 56 is above the minimum allowable SOC limit.

The powertrain 26 changes to operating mode A in the torque transfer phase near completion of the downshift so that ERAD operates as generator to produce negative torque 86, which reduces the net total driveline output torque in order to soften or eliminate the output torque spike 88, which would normally occur without torque modulation. Unlike that of the conventional case, with an HEV this excess torque 89 is converted into electrical energy to be stored by battery 56 while achieving the requested torque modulation and providing optimum shift quality.

Figure 10:
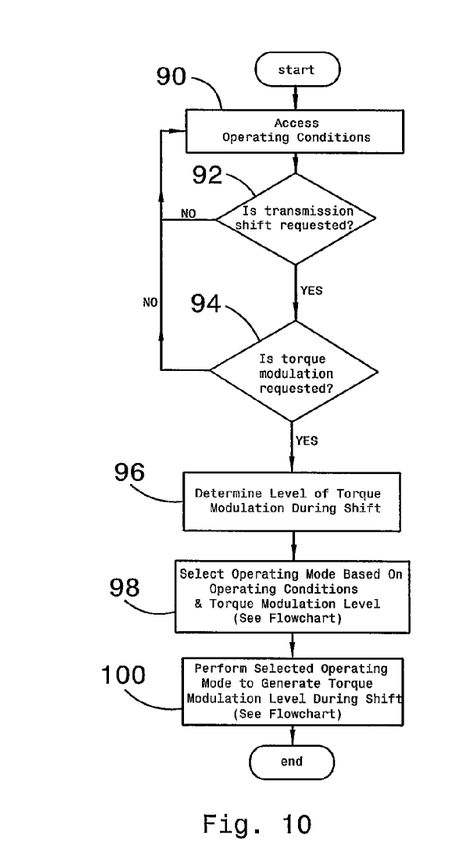
FIG. 10 is a logic flow diagram of an algorithm for selecting the operating mode of the powertrain of FIG. 3 during output torque modulation control.

FIG. 10 shows the steps of an algorithm for providing output torque modulation transmission control of the HEV powertrain 26 of FIG. 3. After execution of the algorithm is started and the operating conditions of powertrain 10 are assessed at step 90, a test is performed at step 92 to determine whether a gear ratio change of the transmission 34 has been requested by a transmission controller acting in response to vehicle parameters that include without limitation engine throttle position, accelerator pedal position, vehicle speed, engine speed, the position of a manually operated gear selector, and a schedule of the preferred gear ratios related to the vehicle parameters.

If the result of test 92 is logically positive, control advances to step 94 where a test is performed to determine whether shift output torque modulation is requested by the controller. If the result of either test 92 or 94 is logically negative, control returns to step 90. But if the result of test 94 is positive, the magnitude of desired output torque modulation is determined at step 96. The desired magnitude of output torque modulation is determined based on the progress of the shift event. For example, at the beginning of the ratio change phase of an upshift, the desired magnitude will ramp from zero to a negative steady-state level as the ratio change phase continues, and will ramp back to zero as the ratio change phase is completed.

Figure 11:
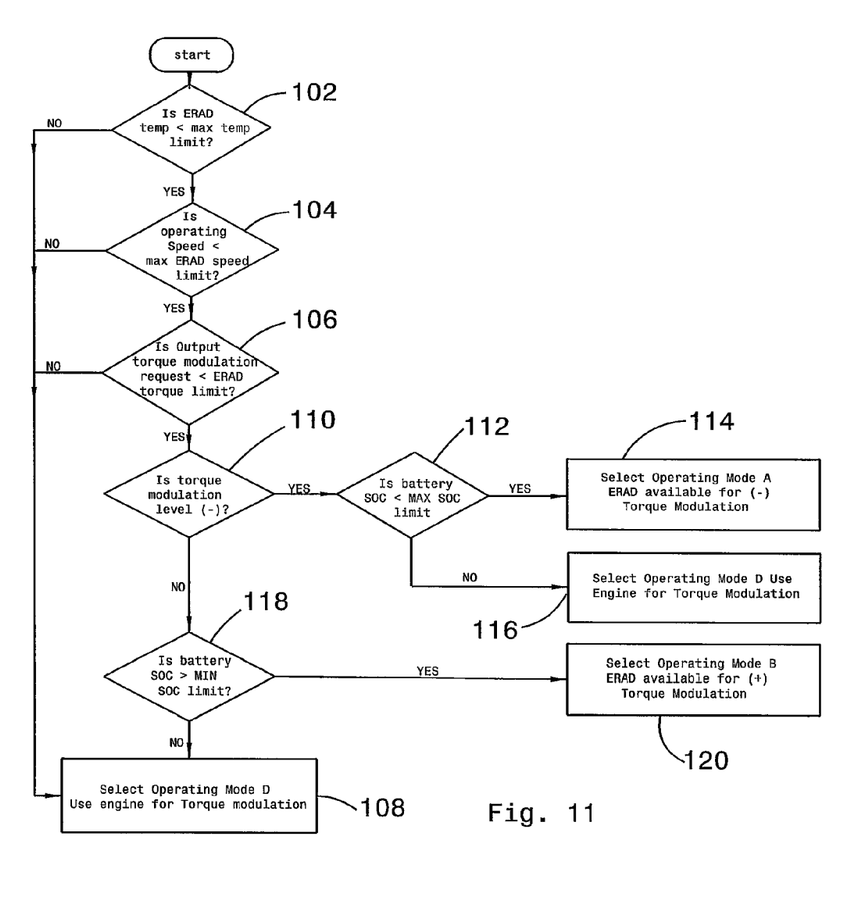
FIG. 11 is a logic flow diagram of an algorithm for providing output torque modulation transmission control in the HEV powertrain of FIG. 3.

At step 98, the operating mode of powertrain 26 is selected in accordance with the algorithm of FIG. 11 upon reference to current operating parameters and the desired magnitude of output torque modulation.

At step 100, powertrain 26 is placed in the desired operating mode selected by the algorithm of FIG. 11 in order to provide the desired output torque modulation during the shift event.

Referring now to the algorithm for selecting the desired operating mode shown in FIG. 11, a test is performed at step 102 to determine whether the ERAD 38 temperature is less than a reference temperature representing the maximum allowable operating temperature of the ERAD.

If the result of test 102 is positive, a test is performed at step 104 to determine whether the speed of ERAD 38 is less than a reference speed representing the maximum allowable operating speed of the ERAD.

If the result of test 104 is positive, a test is performed at step 106 to determine whether the magnitude of a request for transmission output torque modulation is less than a reference torque limit representing the current maximum torque capability of ERAD 38.

If the result of any of tests 102, 104 and 106 is negative, control advances to step 108, where powertrain 10 is placed in operating mode D, in which torque produced by engine 28 alone is transmitted to transmission output 36 without CISG 30 torque affecting any change in torque carried on crankshaft 52 to the transmission input 52, i.e., CISG 30 neither produces nor draws power. Operating mode D, shown in FIG. 7, is that of a conventional vehicle and the engine torque will be reduced to provide the desired level of output torque modulation since CISG 30 and ERAD 38 cannot be used.

If the result of test 106 is positive, a test is performed at step 110 to determine whether the desired magnitude of transmission output torque modulation is negative. If the result of test 110 is positive indicating that the desired output torque modulation level is negative, a test is performed at step 112 to determine whether the battery SOC is less than a maximum allowable SOC reference.

If the result of test 112 is positive indicating that the battery SOC can be further increased while ERAD 38 is operated as an electric generator, at step 114 operating mode A is selected as the operating mode for powertrain 26 and ERAD 38 performs output torque modulation by converting power produced by engine 12 into electrical energy to be stored by battery 56 during an upshift while achieving the desired output torque modulation level.

If the result of test 112 is negative indicating that the battery SOC cannot be further increased, control advances to step 116, where powertrain 26 is placed in operating mode D, in which torque produced by engine 12 alone is transmitted to output shaft 40 without ERAD participating in the torque modulation.

If the result of test 110 is negative indicating that the desired output torque modulation level is positive and the output shaft 40 torque is to be increased, a test is performed at step 118 to determine whether the battery SOC is greater than a minimum SOC.

If the result of test 118 is positive, indicating that the battery SOC can be further decreased, control advances to step 120, At step 120 operating mode B is selected, indicating that ERAD 38 is available to function as a motor and to participate in output torque modulation by supplementing power produced by engine 28 during a downshift.

If the result of test 118 is negative, indicating that the minimum battery SOC limit has been reached, control advances to step 108, where powertrain 26 is placed in operating mode D, in which torque produced by engine 28 alone is transmitted to output 40 without ERAD 38 torque affecting any change in torque carried on output shaft 40.

The output torque modulation control can be applied to RWD, FWD, AWD full or mild HEV powertrain configurations that include at least one electric machine driveably connected to the transmission output 36. Furthermore, the control strategy is not limited to any particular transmission technology, but can be applied to a conventional automatic transmission, a dual clutch powershift transmission, and a converterless automatic transmission.

In accordance with the provisions of the patent statutes, the preferred embodiment has been described. However, it should be noted that the alternate embodiments can be practiced otherwise than as specifically illustrated and described.

The invention claimed is:

1. In a powertrain for motor vehicle that includes an engine, an electric machine able to function alternately as a motor and a generator, a transmission having an input driveably connected to the engine and a transmission output driveably connected to the electric machine, and a powertrain output driveably connected to the electric machine and wheels of the vehicle, a method for controlling torque during an upshift comprising the steps of:
   (a) using the engine to produce torque that is transmitted to the powertrain output through the transmission;
   (b) determining whether a battery state of charge is less than a reference maximum state of charge;
   (c) if the battery state of charge is less than the reference maximum state of charge, operating the electric machine as a generator to reduce the torque transmitted to the powertrain output during a ratio change phase of the upshift; and
   (d) if the battery state of charge is equal to or greater than the reference maximum state of charge, discontinuing use of the electric machine.

2. The method of claim 1 further comprising the step of storing in a battery energy produced by the electric machine during the upshift.

3. The method of claim 1 further comprising the steps of:
determining whether a temperature of the electric machine is less than a reference temperature;
executing step (c) if the temperature of the electric machine is less than the reference temperature; and
discontinuing use of the electric machine if the temperature of the electric machine is equal to or greater than the reference temperature.

4. The method of claim 1 further comprising the steps of:
determining whether a speed of the electric machine is less than a reference speed;
executing step (c) if the speed of the electric machine is less than the reference speed; and
discontinuing use of the electric machine if the speed of the electric machine is equal to or greater than the reference speed.

5. The method of claim 1 further comprising the steps of:
determining whether a desired magnitude of torque modulation is less than a current torque capability of the electric machine;
executing step (c) if the desired magnitude of torque modulation is less than the current torque capability of the electric machine; and
discontinuing use of the electric machine if the desired magnitude of torque modulation is equal to or greater than the current torque capability of the electric machine.

6. In a powertrain for motor vehicle that includes an engine, an electric machine able to function alternately as a motor and a generator, a transmission having an input driveably connected to the engine and a transmission output driveably connected to the electric machine, and a powertrain output driveably connected to the electric machine and wheels of the vehicle, a method for controlling torque during an downshift comprising the steps of:
   (a) using the engine to produce torque that is transmitted to the powertrain output through the transmission;
   (b) during a ratio change phase of the downshift, operating the electric machine as a motor to increase a magnitude of torque transmitted to the powertrain output; and
   (c) during a torque transfer phase of the downshift following the ratio change phase, operating the electric machine as a generator to decrease the net magnitude of torque transmitted to the powertrain output.

7. The method of claim 6 further comprising the steps of:
determining whether a temperature of the electric machine is less than a reference temperature;
executing steps (b) and (c) if the temperature of the electric machine is less than the reference temperature; and
discontinuing use of the electric machine if the temperature of the electric machine is equal to or greater than the reference temperature.

8. The method of claim 6 further comprising the steps of:
determining whether a speed of the electric machine is less than a reference speed;
executing step (b) and (c) if the speed of the electric machine is less than the reference speed; and
discontinuing use of the electric machine if the speed of the electric machine is equal to or greater than the reference speed.

9. The method of claim 6 further comprising the steps of:
determining whether a desired magnitude of torque modulation is less than a current torque capability of the electric machine;
executing step (b) and (c) if the desired magnitude of torque modulation is less than the current torque capability of the electric machine; and
discontinuing use of the electric machine if the desired magnitude of torque modulation is equal to or greater than the current torque capability of the electric machine.

10. The method of claim 6 further comprising the steps of:
if a torque modulation request is negative, determining whether a battery state of charge is less than a reference maximum state of charge;
executing step (c) if the battery state of charge is less than the reference maximum state of charge; and
discontinuing use of the electric machine if the battery state of charge is equal to or greater than the reference maximum state of charge.

11. The method of claim 6 further comprising the steps of:
if a torque modulation request is positive, determining whether a battery state of charge is less than a reference minimum state of charge;
executing step (b) if the battery state of charge is greater than the reference minimum state of charge; and
discontinuing use of the electric machine if the battery state of charge is equal to or less than the reference minimum state of charge.

12. In a powertrain for motor vehicle that includes an engine, an electric machine able to function alternately as a motor and a generator, a transmission having an input driveably connected to the engine and a transmission output driveably connected to the electric machine, and a powertrain output driveably connected to the electric machine and wheels of the vehicle, a method for controlling torque during an downshift comprising the steps of:
   (a) using the engine to produce torque that is transmitted to the powertrain output through the transmission;
   (b) during a ratio change phase of the downshift, operating the electric machine as a motor to increase a net magnitude of torque transmitted to the powertrain output;
   (c) controlling a net torque transmitted to the transmission input by using the transmission to transmit power from the engine to the powertrain output and concurrently using the electric machine to transmit power to the powertrain output;
   (d) operating the electric machine as a generator to decrease said net magnitude of torque during a torque transfer phase of the downshift following the ratio change phase.

13. The method of claim 12 further comprising the step of storing in a battery energy produced by the electric machine during the torque transfer phase of the downshift.

14. The method of claim 12 further comprising the steps of;
determining whether a temperature of the electric machine is less than a reference temperature;
executing step (b) if the temperature of the electric machine is less than the reference temperature; and
discontinuing use of the electric machine if the temperature of the electric machine is equal to or greater than the reference temperature.

15. The method of claim 12 further comprising the steps of:
determining whether a speed of the electric machine is less than a reference speed;
executing step (b) if the speed of the electric machine is less than the reference speed; and
discontinuing use of the electric machine if the speed of the electric machine is equal to or greater than the reference speed.

16. The method of claim 12 further comprising the steps of:
determining whether a desired magnitude of torque modulation is less than a current torque capability of the electric machine;
executing step (b) if the desired magnitude of torque modulation is less than the current torque capability of the electric machine; and discontinuing use of the electric machine if the desired magnitude of torque modulation is equal to or greater than the current torque capability of the electric machine.

17. The method of claim 12 further comprising the steps of:
determining whether a desired magnitude of torque modulation is less than a current torque capability of the electric machine;
executing step (b) and (c) if the desired magnitude of torque modulation is less than the current torque capability of the electric machine; and
using the electric machine and the engine if the desired magnitude of torque modulation is equal to or greater than the current torque capability of the electric machine.

18. The method of claim 12 further comprising the steps of:
if a torque modulation request is negative, determining whether a battery state of charge is less than a reference maximum state of charge;
operating the electric machine as a generator to decrease said net magnitude of torque during a torque transfer phase of the downshift following the ratio change phase, if the battery state of charge is less than the reference maximum state of charge; and
discontinuing use of the electric machine if battery state of charge is equal to or greater than the reference maximum state of charge.

19. The method of claim 12 further comprising the steps of:
if a torque modulation request is positive, determining whether a battery state of charge is less than a reference minimum state of charge;
executing step (b) if the battery state of charge is greater than the reference minimum state of charge; and
discontinuing use of the electric machine if the battery state of charge is equal to or less than the reference minimum state of charge.

* * * * *